United States Patent [19]
Wuelpern

[11] 3,859,800
[45] Jan. 14, 1975

[54] AIR CONVECTION DEVICE 2 A.G. FOR PERMAFROST STABILIZATION

[75] Inventor: Louis E. Wuelpern, Midland, Mich.

[73] Assignee: The Dow Chemical Company, Midland, Mich.

[22] Filed: Mar. 15, 1973

[21] Appl. No.: 341,787

[52] U.S. Cl.............. 61/36 A, 62/260, 165/45, 165/104
[51] Int. Cl............... E02d 3/00, F28 7/00
[58] Field of Search......... 61/36 A; 62/260; 165/45, 165/142, 104; 166/DIG. 7

[56] References Cited
UNITED STATES PATENTS

| | | | |
|---|---|---|---|
| 1,717,005 | 6/1929 | Carrier.................. | 62/260 |
| 2,193,219 | 3/1940 | Bowie et al............ | 61/36 A |
| 2,554,661 | 5/1951 | Clancy.................. | 62/260 |
| 3,135,097 | 6/1964 | Scheinberg........... | 61/36 A |
| 3,220,470 | 11/1965 | Balch.................... | 61/36 A |
| 3,271,710 | 9/1966 | Leonard................ | 165/45 |
| 3,602,323 | 8/1971 | Schuh................... | 61/50 |
| 3,674,086 | 7/1972 | Foster................... | 165/45 |

OTHER PUBLICATIONS

"Permafrost and Related Engineering Problems" By Brown and Johnston, Endeavor, Vol. XXIII Ne89, May 1964, pp. 5, 6.
"Arctic Construction" U.S. Army Corps of Engineers, Oct. 1961, pp. 5, 8.

*Primary Examiner*—Paul R. Gilliam
*Assistant Examiner*—Alex Grosz
*Attorney, Agent, or Firm*—Lloyd E. Hessenaur, Jr.

[57] ABSTRACT

A device and method for removing heat from permafrost soil to stabilize the same. The device and method directly utilizes cold atmospheric air as a direct heat exchange media to remove such heat by convection. The device includes a continuous passageway permitting cold air to enter directly from the atmosphere, pass adjacent the permafrost soil to remove heat and then be vented back to the atmosphere.

7 Claims, 3 Drawing Figures

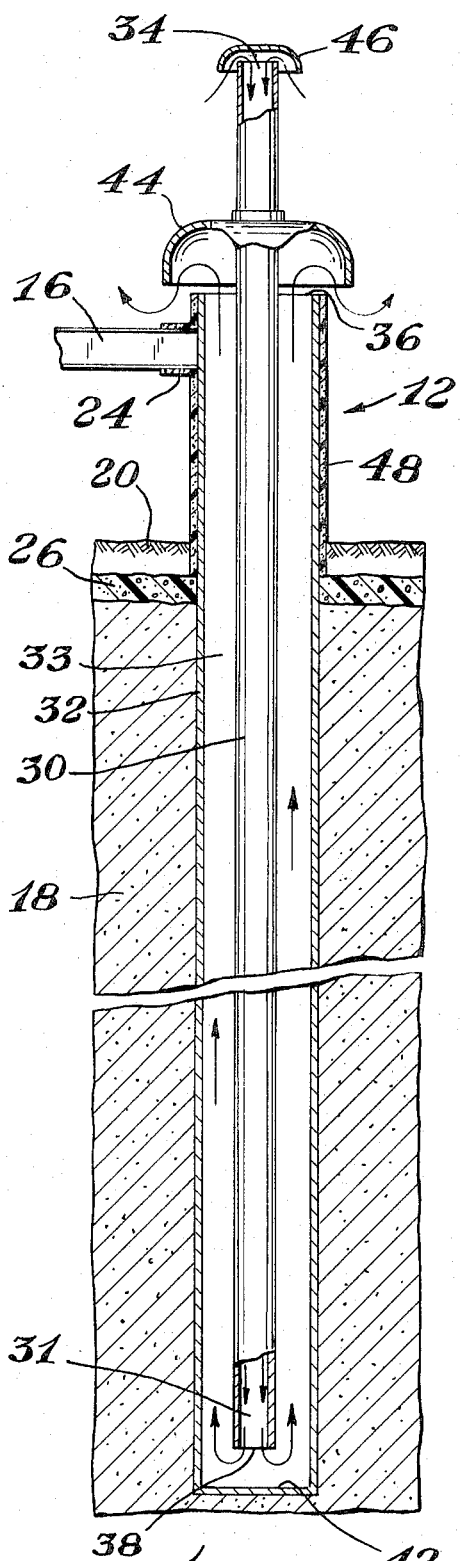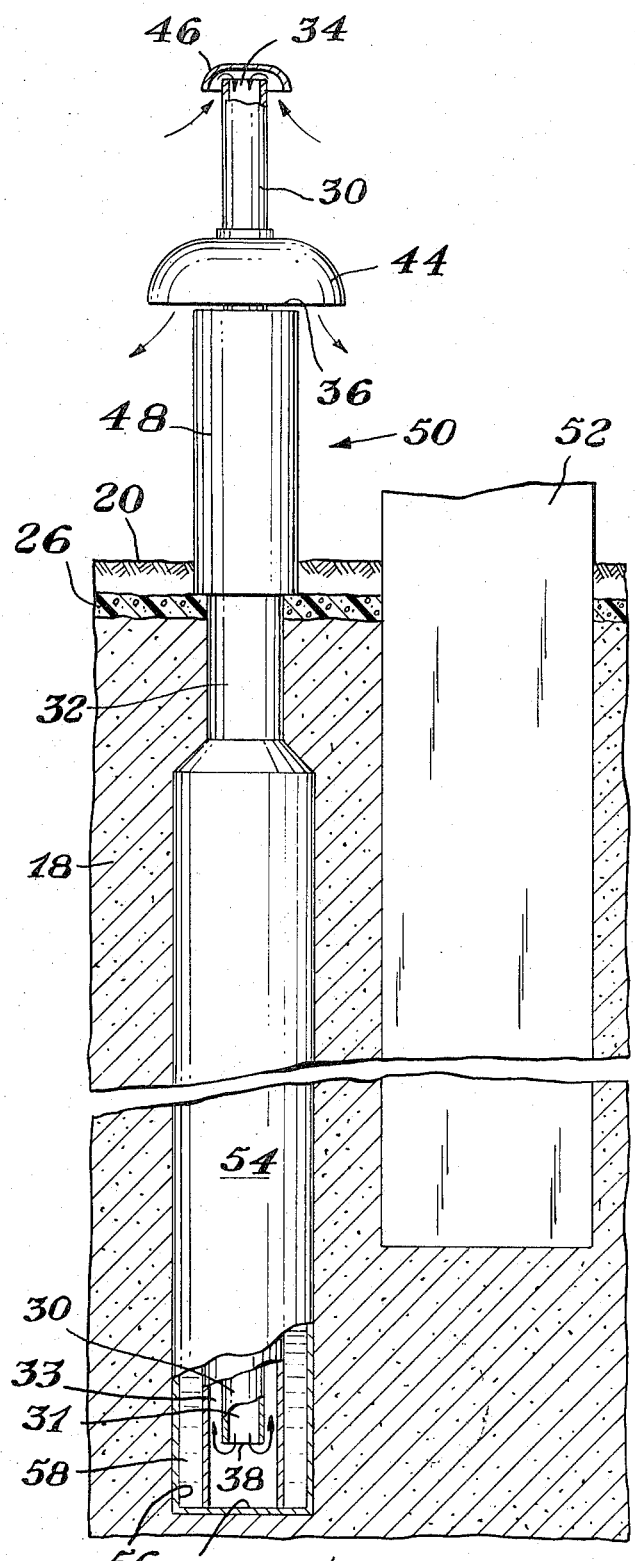

3,859,800

AIR CONVECTION DEVICE 2 A.G. FOR PERMAFROST STABILIZATION

BACKGROUND OF THE INVENTION

This invention relates to the field of maintaining permafrost soil in a permanently frozen condition so that the same can be utilized for several structural and other purposes and yet remain stable. For example, if the permafrost soil is maintained permanently frozen it can successfully support pilings, building, above-ground or in-ground pipe or utility lines, and the like. The device itself can form the piling, or it can be located adjacent an underground member supported in the permafrost to stabilize the supporting soil.

Attempts to accomplish permafrost stabilization has in the past been primarily with the use of closed thermal systems including an enclosed liquid which liquid acted as a conductor for removing heat, which heat then had to be eventually dissipated indirectly via the liquid to the air. Typical prior art in this area is shown, for example, by U.S. Pat. Nos. 3,472,314. 3,564,862; 3,650,327; 3,662,832 and 3,675,086. Heretofore, systems for passing air directly through soil so as to effect convection have been directed to other purposes than permafrost stabilization, such as for example, U.S. Pat. No. 3,424,232 which concerns cooling air within a building by first passing it through the ground. Another similar prior art teaching is found in U.S. Pat. No. 504,544. None of the prior art teachings recognize, anticipate or suggest the utilization of direct air convection for permafrost stabilization.

SUMMARY OF THE INVENTION

This invention utilizes cold atmospheric air as a direct heat exchange media passing through a specially designed device, so as to stabilize permafrost adjacent the device. Such a device can sub-cool the permafrost in the winter and thus build up in effect a heat sink that will have sufficient heat capacity to absorb summer heat, and possibly other heat inputs, and still maintain the permafrost in a frozen condition. The device would operate only in cold periods, such as occur in the winter season, and not in the warmer periods, such as occur in the summer season, since convection results only when the outside air is colder than the soil temperature in which it is located. The device optionally can be complemented by a thermocell for added heat sink capacity where desired.

BRIEF DESCRIPTION OF THE DRAWINGS

Yet additional objects and advantages of the present invention are even more apparent when taken in conjunction with the accompanying drawing in which like characters of reference designate corresponding material and parts throughout the several views thereof, in which:

FIG. 2 is an enlarged cross-sectional view of one of the pilings shown in FIG. 1, which piling incorporates the principles of the present invention; and FIG. 3 is an elevational view, partly in cross section, showing a modified version of the thermo-tube concept of the present invention adjacent a foundation or other structure supported in stabilized permafrost.

DESCRIPTION OF THE PREFERRED EMBODIMENT

Figure 1:
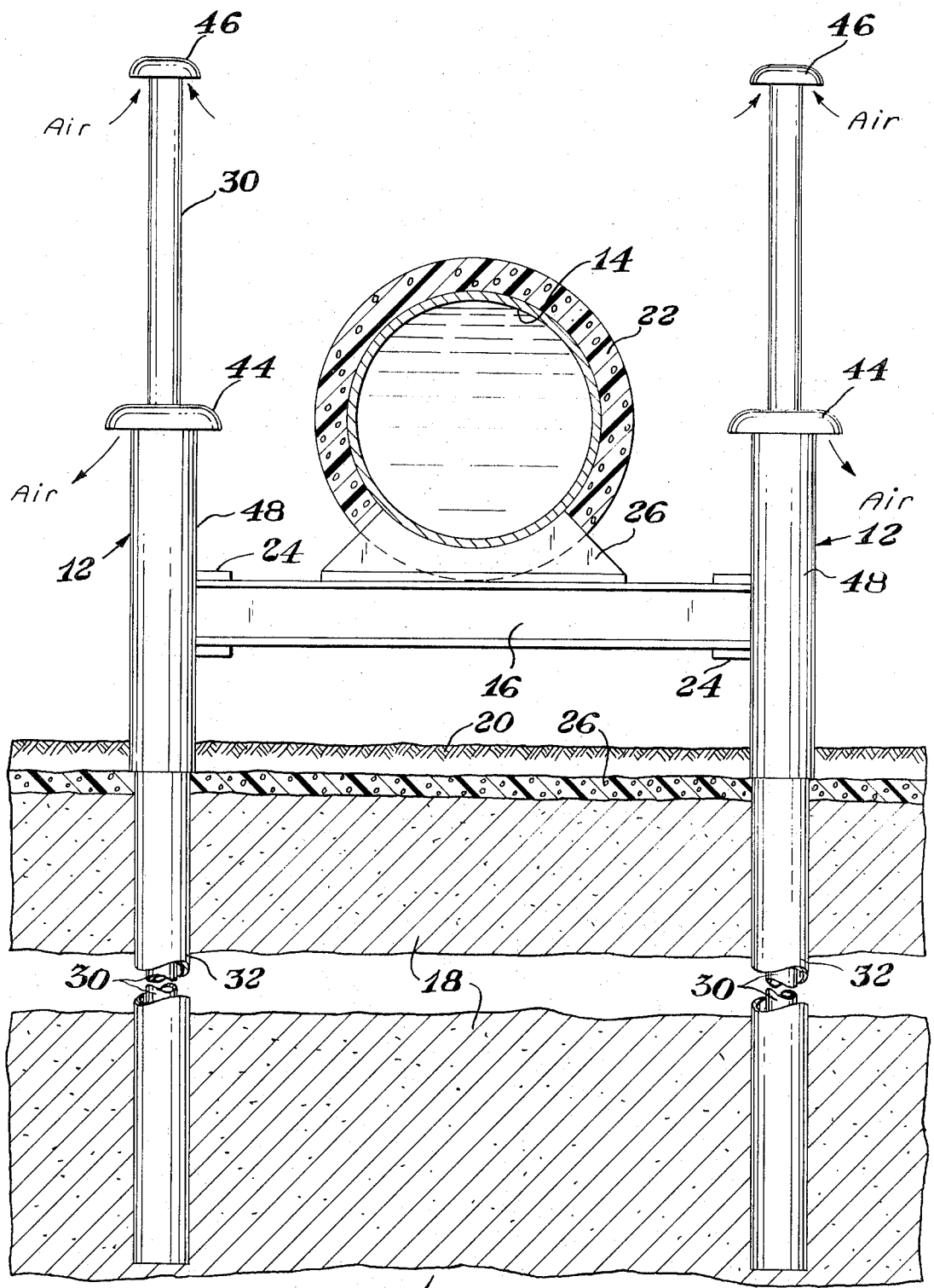
FIG. 1 is a schematic elevational view, with parts in section, of two thermo-tubes employed as pilings to support a heavy oil pipeline above stabilized permafrost.

One preferred embodiment of the present invention is that depicted in FIG. 1. Here two like pilings 12 are illustrated as being used as support for a hot oil pipeline 14 which rests upon a brace 16 suspended between the pilings 12. Pilings 12 are actually devices, in the form of thermo-tubes, providing for permafrost stabilization by utilizing cold atmospheric air as a direct heat exchange media. The pilings 12 are supported in permafrost soil 18. By permafrost or permafrost soil it is generally meant soil, rock, tundra or other ground or earthen material which is frozen in the winter and which does not completely thaw in the summer months. It very often has a high water content so that if it becomes thawed to any significant extent it is unable to adequately support significant structures placed on or in it, that is, becomes substantially unstable. Another explanation of permafrost can be found in such places as in the "Environmental Atlas of Alaska" by E. R. Johnson and Z. W. Hartman, published in 1969 by The Institute of Water Resources, University of Alaska.

In FIG. 1 the permafrost is generally designated by the reference character 18 and includes a surface or tundra layer 20. The brace 16 can be connected by welding, riveting or by any other common technique at each of its ends to the piles 12. If the pipeline 14, which can be as large as 4 feet in diameter, for example, carries warm fluids such as heated oil (which can come from the ground at temperatures above 140°F.) it may be preferable to include an insulating layer 22 with a high thermal insulating factor, such as a closed cell expanded polystyrene, polyurethane or other such material, between itself and the tundra 20 so as to prevent radiation of its heat to the permafrost. This layer 22 may entirely surround the pipe 14 itself where other than radiation to just the permafrost is a concern as, for example, to keep the oil from cooling too much. The pipe 14 with its insulation layer 22 can be supported on a saddle 26 resting on the brace 16, which in turn is supported by pilings 12. To further aid in preventing heat degradation from either the hot oil in pipe 14 or from the sun during the warmer seasons of the year, there can be located yet another insulating layer 26, such as the plastic foams to which reference was previously made, preferably somewhat below the surface of the tundra 20. Whether or not the insulation layer 26 is desired depends on how severe the thawing problem may be expected to be in a given situation. The insulating layer 26 can even include an aluminum or other reflective skin (not shown) on its upper surface to act as a heat reflector if heat radiation conditions are especially severe. Thus, the thermo-tube or piling 12 can be used to remove heat from the permafrost and insulation layer 26 will help prevent heat penetration into the permafrost.

Details of one of the pilings 12 which forms a thermo-tube or air convection device according to the principles of the present invention is more fully illustrated in FIG. 2. The air convection device shown as thermo-tube or piling 12 is an embodiment consisting of two concentric pipes or tubes that provide joined inner and outer passageways 31 and 33, respectfully, to permit air flow, as shown by the arrows, to remove heat from the adjacent permafrost by natural convection. The device comprises an inner tube 30 located within an outer tube 32, that latter providing a chamber for the innards of the device, both inner and outer tubes being open to the atmosphere at their upper ends 34 and 36, respectively. However, only inner tube 30 is also open at its lower end 38. Outer tube 32 is closed at its lower end 42. Inner tube end 38 is located a spaced distance above outer tube end 42 so as to provide a continuous flow path (shown by the arrows) for the circulating air. Preferably, inner tube end 34 extends significantly above outer tube end 36 so that there is less likely to be interference with the incoming cold air into the tube end 34 by the vented warmer air leaving the device through upper end 36 of outer tube 32. A shield 44 can be located closely adjacent the upper open end 36 of the outer tube so as to prevent precipitation or other undesirable fluids, materials or foreign objects from entering the same. Likewise, there can be a shield 46 over the cold air inlet in upper end 34 of inner tube 30 to protect the same from entry by precipitation and other undesirable materials or foreign objects. To provide some feeling for relative sizes, outer tube 32, for example, if circular in cross-section, could be approximately 6 to 8 inches in diameter and from 10 to 20 feet long, and inner tube 30, if circular in cross-section, can be 2 to 4 inches in diameter or from 15 to 25 feet long, the lower end 38 of the tubing being spaced from 2 to 4 inches from end 42, all of which will provide sufficient air passageway to accomplish the desired function.

Preferably outer tube 32 is of a heat conducting material, such as aluminum, steel or other suitable thermal conductor for transmitting heat from the permafrost to the passageway 33. The upper portion of outer tube 32 exposed to the environment is preferably insulated by a plastic foam or other insulation material 48 so that when the upper exposed end of the tube is subjected to the heat from the environment or otherwise, such heat is not conducted into the lower portion of the tube 32. This foam insulation can be extended partly or wholly, as at 24, along brace 16 to minimize further heat conduction to the tube 32. The insulation material 48 can also extend along the upper inside as well as the upper outside of tube 32, if desired. The inner tube 30 can also be formed of an insulating plastic material, such as a polyolefinic or polyvinylidene chloride resin or the like, or a pipe lined with plastic or other insulating material so that the cold air coming in the cold air inlet can pass through passageway 31 to the very bottom end 38 without significant heat gain. Once the cold air reaches the bottom end 38 it can then very quickly absorb the heat from the surrounding permafost and move quickly up passageway 33 through the warm air outlet at the upper end 36 of the tube 32. For example, good convection will be achieved if the permafrost soil is about 30°F. and the cold air coming through the cold air inlet at upper end 34 of tube 32 is from 25°F. to something as low as −60°F., such air temperatures being those not uncommonly encountered in the State of Alaska, for example. Of course, the greater the temperature differential, the greater the degree of convection.

Thus, each thermo-tube or piling 12 operates when the temperature of the air is lower than the permafrost temperature. This is because the air in the annulus formed by passageway 33 is warmer and has a lower density and is forced upward and out of the annulus. This process will continue as long as such temperature differential conditions exist.

The particular details above, of course, are only illustrative and can be varied considerably and still achieve the intended purpose, the most desirable dimensions (size), configuration, materials and the like depending on the particular application for which the device is used. Also, some details have not been shown for purposes of simplicity, such as, for example, the inner tube could be supported on the bottom end of the outer tube by a tripod brace which would not substantially interfere with air flow. Also a guide ring, not shown, could be fastened near the upper end of the inner tube to maintain its central position with respect to the outer tube.

To further illustrate variations of the present invention a modification of the same is illustrated in FIG. 3. Here a thermo-tube 50 having many of the basic components and functions of a piling 12 (like reference characters designating corresponding parts of each) is located in permafrost 18 adjacent a structure 52 which itself is also located in and supported by the permafrost 18. Structure 52 can be any number of things, such as a concrete rat-wall foundation for a building, a base for posts, a bridge abutment, a well-head, and the like, which must depend on a continuously relatively stable permafrost for their support. Thermo-tube 50, which can be one of several located adjacent structure 52, functions by natural air convection through passageways 31 and 33 in the same manner as in thermo-tube or piling 12. For added efficiency, an optional thermo-cell 54 can be located about or adjacent to outer tube 32, which thermocell provides an added chamber for containing a liquid 58, such as a salt or glycol solution, having a freezing point below that of the adjacent permafrost so as to function as a heat sink to prevent permafrost thawing. The liquid is preferably frozen at the commencement of the thawing season and has sufficient thermal capacity so that it is not completely thawed prior to the freezing season. Upon commencement of the freezing season, cold air passing through passageway 33 will refreeze the liquid 58 to prepare it for the next thawing season, and the process is repeated.

While certain representative embodiments have been shown for purposes of the invention, it will thus be apparent to those skilled in the art that various changes and modifications can be made therein without departing from the spirit and scope of the invention. For example, heat conducting vertical fins could be used in the annulus or passageways formed by the inner and outer tubes to increase the inside surface area for effecting a greater heat removal capacity. Also, fins could be extended outwardly from the outer tube into the permafrost soil to aid in conduction of the heat from the permafrost to the passageway between the inner and outer tubes. The use of such features, and the like, would depend on whether the gain in capacity justifies the increased cost and perhaps the need for fewer units.

Accordingly, what is claimed is:

1. A device for stabilizing permafrost adjacent thereto, said device located in the permafrost to a significant depth and having a longitudinal chamber, the outer wall portion of said chamber being of a substantially thermal conducting material, said device including inner and outer passageways extending longitudinally within said chamber, both of said passageways being open to the atmosphere at their uppermost extents, said passageways being in open communication with one another adjacent their lowermost extents, a thermocell having itself a chamber containing a liquid of a freezing temperature below that of said permafrost, said thermocell located at least partially about or adjacent said outer wall and penetrating into said permafrost, whereby air at a temperature less than that of the adjacent permafrost can enter the inner passageway and pass therefrom into the outer passageway adjacent the thermocell located in said permafrost so as to act as a direct heat exchange media to remove heat from said thermocell which in turn absorbs heat from the permafrost to thereby stabilize the permafrost.

2. The device of claim 1 wherein said inner passageway is defined by a generally self-supporting substantially non-thermal conducting material so that the temperature of the incoming cold air is not substantially reduced prior to reaching the outer passageway.

3. The device of claim 2 wherein the extent of the outer wall of the chamber extending above said permafrost is thermally insulated so as to reduce the conductivity of warm air by said chamber into the permafrost.

4. The device of claim 3 wherein insulation layers are generally laterally disposed from the device below the surface of the permafrost to reduce the conduction of heat radiation into the permafrost therebelow.

5. The device of claim 4 wherein the open upper ends of the passageway have shields spacedly located directly thereabove so as to prevent entry of undesirable elements thereinto.

6. The device of claim 1 wherein the same is a piling supporting another structure.

7. The device of claim 1 wherein the same is located adjacent a structure to stabilize the permafrost supporting the structure.

* * * * *